United States Patent
Bruck

(10) Patent No.: US 9,085,042 B2
(45) Date of Patent: Jul. 21, 2015

(54) STUD WELDING REPAIR OF SUPERALLOY COMPONENTS

(75) Inventor: Gerald J. Bruck, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 287 days.

(21) Appl. No.: 13/571,754

(22) Filed: Aug. 10, 2012

(65) Prior Publication Data

US 2014/0044984 A1 Feb. 13, 2014

(51) Int. Cl.
| | |
|---|---|
| B23K 33/00 | (2006.01) |
| B32B 15/01 | (2006.01) |
| B23K 9/20 | (2006.01) |
| B23P 6/00 | (2006.01) |
| F01D 5/00 | (2006.01) |

(52) U.S. Cl.
CPC ............ *B23K 9/201* (2013.01); *B23P 6/005* (2013.01); *B23K 2201/001* (2013.01); *F01D 5/005* (2013.01); *F05D 2230/232* (2013.01); *Y10T 428/12396* (2015.01)

(58) Field of Classification Search
None
See application file for complete search history.

(56) References Cited

U.S. PATENT DOCUMENTS

| | | | |
|---|---|---|---|
| 1,592,609 A * | 7/1926 | Mattice | 219/137 R |
| 3,119,632 A | 1/1964 | Skinner | |
| 3,487,530 A | 1/1970 | Ely | |
| 4,912,295 A | 3/1990 | Arimochi et al. | |
| 5,479,704 A | 1/1996 | Richter et al. | |
| 5,609,776 A * | 3/1997 | Li | 219/76.14 |
| 6,210,635 B1 | 4/2001 | Jackson et al. | |
| 6,213,379 B1 * | 4/2001 | Takeshita et al. | 228/112.1 |
| 6,327,766 B1 * | 12/2001 | Cardente | 29/402.16 |
| 6,413,650 B1 * | 7/2002 | Dupree et al. | 428/579 |
| 6,994,920 B2 | 2/2006 | Trewiler | |
| 8,158,903 B2 | 4/2012 | Meier | |
| 2004/0134887 A1 * | 7/2004 | Murphy | 219/76.14 |
| 2005/0092717 A1 | 5/2005 | Treweiler | |
| 2008/0237306 A1 | 10/2008 | Sathian | |
| 2009/0266870 A1 | 10/2009 | Yousefiani et al. | |
| 2011/0031223 A1 * | 2/2011 | Belanger | 219/121.14 |

(Continued)

FOREIGN PATENT DOCUMENTS

| | | |
|---|---|---|
| DE | 4411680 C1 | 8/1995 |
| DE | 4447403 C1 | 1/1996 |

(Continued)

OTHER PUBLICATIONS

Translation of DE 4411680 (EP0676259). Aug. 1995.*
U.S. Appl. No. 13/352,468, filed Jan. 18, 2012, entitled "Projection Resistance Welding of Superalloys", (Siemens-142).

*Primary Examiner* — John J Zimmerman

(57) ABSTRACT

Superalloy components are joined or repaired by mating a recess formed in one component substrate with a corresponding projection formed in another component along a contact surface and welding them together with a stud welding apparatus. A mating superalloy repair stud is formed with a stud projection whose profile conforms to the substrate recess profile along a corresponding contact surface. Both the stud and substrate are coupled to a stud welding apparatus, with the stud projection and substrate recess oriented in an opposed spaced relationship with a gap there between. The stud welding apparatus passes current between the stud projection and recess and forms an arc there between, to melt their respective opposed surfaces. The melted stud projection and substrate recess opposed surfaces are pressed into contact with each other with the stud welding apparatus, forming a weld there between.

20 Claims, 2 Drawing Sheets

(56) References Cited

U.S. PATENT DOCUMENTS

| | | | |
|---|---|---|---|
| 2011/0062219 A1* | 3/2011 | Bezaire et al. | 228/114 |
| 2011/0168679 A1 | 7/2011 | Qi et al. | |
| 2011/0233293 A1* | 9/2011 | Kral et al. | 238/122 |
| 2012/0063894 A1* | 3/2012 | Chen et al. | 415/213.1 |
| 2012/0205014 A1* | 8/2012 | Bruck et al. | 148/527 |
| 2013/0081269 A1* | 4/2013 | Trapp et al. | 29/888 |
| 2013/0115091 A1* | 5/2013 | Bruck et al. | 416/223 R |
| 2013/0263434 A1* | 10/2013 | Gugel | 29/525.14 |

FOREIGN PATENT DOCUMENTS

| | | | |
|---|---|---|---|
| EP | 1527839 | | 5/2005 |
| FR | 2619331 | | 8/1988 |
| GB | 1368846 | * | 10/1974 |
| JP | 56-21736 | * | 2/1981 |

* cited by examiner

STUD WELDING REPAIR OF SUPERALLOY COMPONENTS

BACKGROUND OF THE DISCLOSURE

1. Field of the Invention

The invention relates to joining of advanced superalloy components during fabrication or repair. In some embodiments, the invention relates to surface repair of superalloy turbine blades and vanes in steam or gas turbines, by use of studs that are affixed to a repaired substrate by electric arc heating of the stud and substrate to melt the surface of each, followed by driving the stud into the substrate under pressure, in a manner that does not significantly reduce mechanical structural or material properties of the joined components.

2. Description of the Prior Art

"Structural" repair of gas turbine or other superalloy components is commonly recognized as replacing damaged material with matching alloy material and achieving properties, such as strength, that are close to the original manufacture component specifications (e.g., at least seventy percent ultimate tensile strength of the original specification). For example, it is preferable to perform structural repairs on turbine blades that have experienced surface cracks, so that risk of further cracking is reduced, and the blades are restored to original material structural and dimensional specifications.

Structural repair or new fabrication of nickel and cobalt based superalloy material that is used to manufacture turbine components, such as cast turbine blades, is challenging, due to the metallurgic properties of the finished blade material. For example, a superalloy having more than 6% aggregate aluminum or titanium content, such as CM247 alloy, is more susceptible to strain age cracking when subjected to high-temperature welding than a lower aluminum-titanium content X-750 superalloy. The finished turbine blade alloys are typically strengthened during post casting heat treatments, which render them difficult to perform subsequent structural welding. Currently used welding processes for superalloy structural fabrication or repair generally involve substantial melting of the substrate adjoining the weld preparation, and complete melting of the welding rod or other filler material added. When a blade constructed of such a material is welded with filler metal of the same or similar alloy, the blade is susceptible to solidification (aka liquation) cracking within and proximate to the weld, and/or strain age (aka reheat) cracking during subsequent heat treatment processes intended to restore the superalloy original strength and other material properties comparable to a new component.

A past attempt to perform traditional "spot" electric resistance welding of superalloys, in a heat resistance joining apparatus, by passing current between compressed electrodes into a pair of abutting superalloy components also caused solidification cracking within the weld zone. Alternative superalloy welding processes, including laser micro cladding with chill fixtures, welding in so-called "hot" boxes at elevated temperatures, and inertia friction welding may still lead to post weld heat treatment strain age cracking. Other friction welding processes, such as friction stir welding, can reduce superalloy cracking propensity, but the employed welding apparatus has relatively limited tool life. The same cracking concerns occur during superalloy component fabrication, when separate components constructed of superalloy material are joined by welding processes.

Given the shortcomings of superalloy structural repair welding, often the only commercially acceptable solution is to scrap damaged turbine blades that require structural repair, because past experience has shown limited success of such structural repairs. Thus repairs have been limited to those that have in the past been proven to be performed successfully by alternative superalloy welding processes described above, or by cosmetic welding, employing more ductile welding filler materials with reduced structural strength.

Thus, a need exists in the art for a method for performing structural joining or repairs on surfaces of superalloy components, such as turbine vanes and blades, so that subcomponents can be joined; or those structural cracks and other surface defects can be repaired.

Another need exists in the art to increase successful rates of structural repairs on surfaces of superalloy components, such as turbine vanes and blades, so that damaged blade scrap rates can be reduced.

Yet another need exists in the art for a method for performing structural joining or repairs on surfaces of superalloy components, such as turbine vanes and blades, with proven, repeatable repair techniques and machinery that do not require complex welding or post-repair heat treatment procedures.

SUMMARY OF THE INVENTION

Accordingly, an object of the invention is to perform structural joining or repairs on surfaces of superalloy components, such as turbine vanes and blades, so components can be joined; or that structural cracks and other surface defects can be repaired.

Another object of the present invention is to increase the likelihood of performing successful structural repair of superalloy components, such as turbine vanes and blades, so that damaged component scrap rates can be reduced.

Yet another object of the present invention is to perform structural fabrication or repair of superalloy components, such as turbine blades or vanes, with proven, repeatable repair techniques and machinery that do not require complex welding or post-repair heat treatment procedures.

These and other objects are achieved in accordance with the present invention embodiments by structurally joining superalloy components, or repairing defects in superalloy material components, such as turbine blades or vanes. Superalloy components are joined or repaired by mating a recess formed in one component substrate with a corresponding projection formed in another component along a contact surface and welding them together with a stud welding apparatus. A mating superalloy repair stud is formed with a stud projection whose profile conforms to the substrate recess profile along a corresponding contact surface. Both the stud and substrate are coupled to a stud welding apparatus, with the stud projection and substrate recess oriented in an opposed spaced relationship with a gap there between. The stud welding apparatus passes current between the stud projection and recess and forms an arc there between, to melt their respective opposed surfaces. The melted stud projection and substrate recess opposed surfaces are pressed into contact with each other with the stud welding apparatus, forming a weld there between.

In repair embodiments, the surface defect is removed from the component substrate by electric discharge machining or other known metal working process, forming an excavated recess. A repair stud is formed, preferably of a same material with similar mechanical structural properties, having a mating projection with profile conforming to the corresponding recess profile. The repair stud is inserted and captured within a stud welding apparatus fixture and oriented so that the stud mating projection and profile are in opposed mutually spaced relationship with a gap there between. The stud welding apparatus passes current between the stud projection and recess and forms an arc there between, to melt their respective opposed surfaces. The opposed surfaces are driven together under pressure, forming a common weld between the stud projection and the substrate recess.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized for mechanical structural joining/repair of superalloy components. In some embodiments, the teachings of the present invention can be readily utilized for structural repair of superalloy material turbine blades and vanes of the type used in steam or gas turbines, by use of stud-welded repair studs, in a manner that does not significantly reduce mechanical structural or material properties of the joined or repaired blade. In the present repair method, the damage is removed, forming an excavated recess. A repair stud is formed of a same material with similar mechanical structural properties, having a mating outer profile conforming to the corresponding recess profile. The repair stud is inserted and captured within a known stud welding apparatus and oriented in opposed spaced relationship with the recess. The stud welding apparatus then passes an arcing current between the spaced stud and substrate recess until their respective opposed surfaces are melted. Thereafter the stud is driven under pressure into the recess with the stud welding apparatus so that the respective melted surfaces form a weld. The repaired component's overall mechanical structural properties are similar to those of an undamaged component. The repair methods of the present invention do not require complex welding or heat treatment procedures, and use known stud welding apparatus equipment and affixation processes. In addition to performing repairs, the joining methods of the present invention may be used to fabricate superalloy structures by joining subcomponents.

Figure 1:
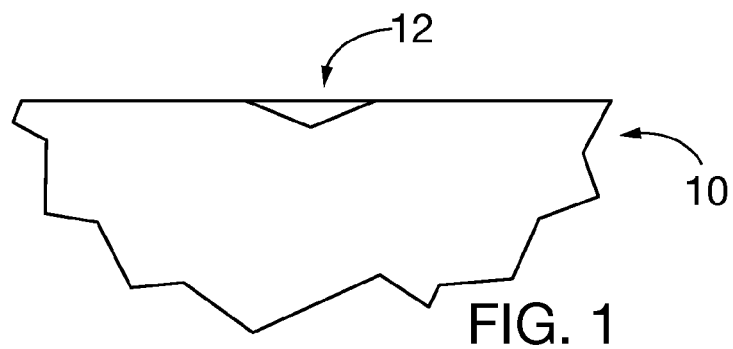
FIG. 1 is a schematic elevational view of an excavation left after removal of a surface defect in a superalloy component being repaired in accordance with an embodiment of the present invention.

FIG. 1 shows an exemplary superalloy component 10 having a surface stress crack that was excavated by electric discharge machining (EDM) or other known metal removal processes, leaving a recess 12 in the uncracked substrate. If the stress cracks are not structurally repaired (i.e., by more than mere cosmetic repair with relatively softer, lower application temperature welding or brazing alloys) there is a possibility that the cosmetically repaired cracks will re-crack and/or continue to spread within the component substrate. The recess 12 profile is defined by the remaining margins of the uncracked substrate 10. While a conical cross-sectional profile recess 12 is shown in FIG. 1, other cross-sectional profile configurations may be utilized, such as vee-shaped or arcuate-shaped profiles formed by cutting tool heads or EDM. The recess diameter may be varied with the permissible range of a stud welding apparatus that is to be used to perform the repair. Suitable plan view profiles for recess 12 include circular symmetrical, square and rectangular profiles. When fabricating a new composite superalloy structure, two superalloy subcomponents are fabricated with mating recess and projection profiles with one placed within the stud welding apparatus, and structurally joined after the arc melting of mating opposed surfaces, followed by driving the components together under pressure with the stud welding apparatus. It is also possible to fabricate with the stud welding apparatus a composite structure that does not have mating recess and projection portions by spacing two components relative to each other, arc heating across the gap and thereafter driving the components together under pressure without any mating projection and recess.

In known repair or fabrication methods, recess 12 would have been filled by heat application of softer filler material (cosmetic repair) or by filler material of similar hardness. As previously discussed, other welding techniques applying superalloy filler generally induce undesirable cracks in the superalloy component during welding or during subsequent post-welding heat treatment.

Figure 2:
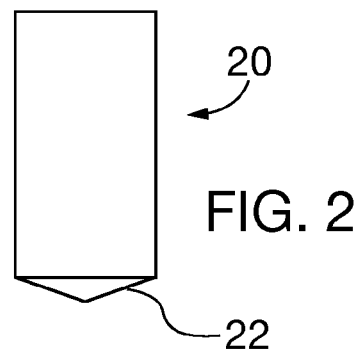
FIG. 2 is a schematic elevational view of a superalloy repair stud used to repair a surface defect in a superalloy component in accordance with an embodiment of the present invention.

The present invention differs from prior known replacement of superalloy material in cracks or formed recesses by utilizing a repair stud 20, preferably constructed of the same superalloy material with similar material properties as the repaired component, as shown in FIG. 2. The repair stud 20 has a projecting portion 22 with a profile that conforms and mates with the recess profile 12. As discussed above, new subcomponents having mating projection and recess portions may be joined to fabricate a new component by the same method.

Figure 3:
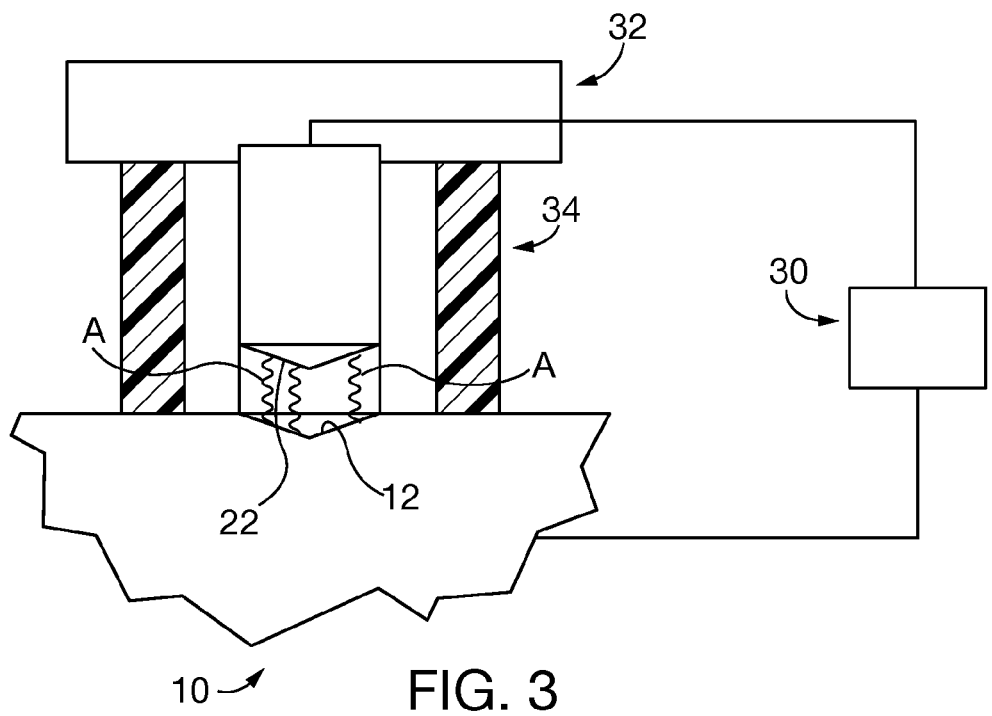
FIG. 3 is a schematic elevational view of a surface excavation in a superalloy component being repaired in accordance with an embodiment of the present invention by arc heating the repair stud and the component substrate with a stud welding apparatus.

Referring to FIG. 3, the repair stud 20 is inserted into a known, conventional stud welding apparatus 30 stud welding fixture 32, surrounded by a ceramic insulating sleeve 34 serving to exclude air from the weld zone, concentrate heat and contain molten metal. (Such sleeve is broken away and discarded after welding). The known stud welding apparatus 30 generates a welding current with a DC power supply or by capacitive discharge and produces an arc across a gap between the substrate 10 and the stud 22 to melt their respective opposed surfaces and thereafter drives the two components into each other so that the respective melted surfaces form a weld.

When performing the repair procedure with the stud welding apparatus 30, the repair stud 20 is oriented proximal the repaired component substrate 10, with the mating projecting portion 22 in mutually spaced, relationship with the recess 12, and having a gap there between. Thereafter the stud welding apparatus 30 passes current between the repair stud 20 and component substrate 10 across the gap between the stud projection 22 and recess 12, forming a high temperature arc A that melts their opposed surfaces on each side of the gap.

Figure 4:
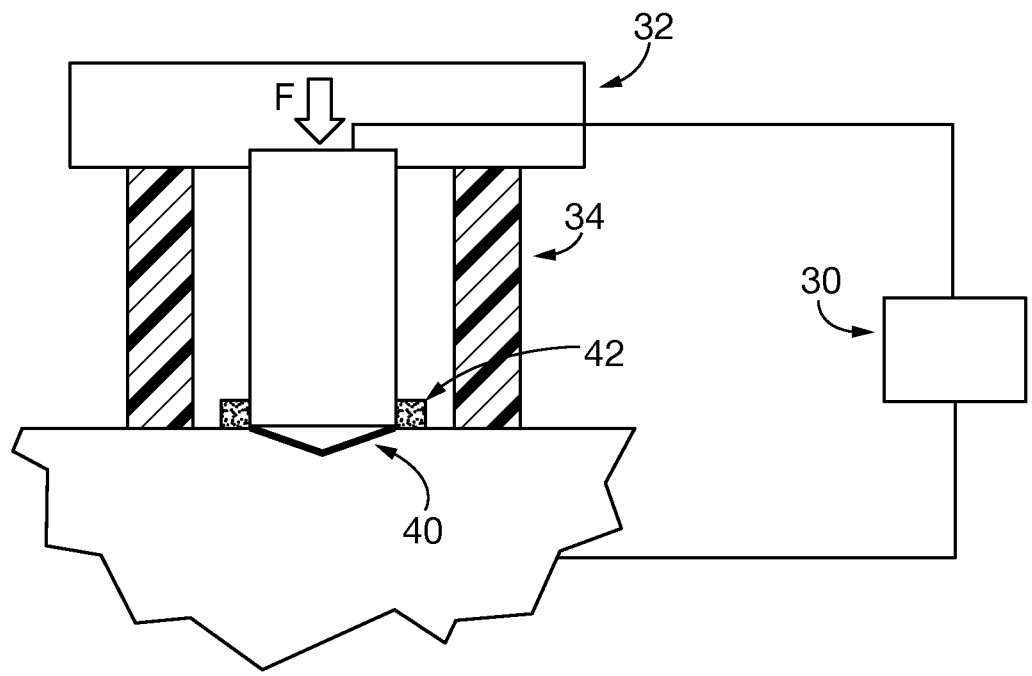
FIG. 4 is a schematic elevational view similar to FIG. 3 after the repair stud is driven into the recess with the stud welding apparatus, forming a thin weld between the stud and the recess.

As shown in FIG. 4, when the opposed mating surfaces of the stud projection 22 and recess 12 are melted, the stud welding apparatus 30 drives and compresses them into each other rapidly and under pressure, with pressure being concentrated along the contact surface, forming a thin weld 40 and extruding excess melted weld into a circumferential fillet 42.

In performing the joining processes of the present invention, sufficient electric current is selectively applied with the stud welding apparatus 30 to cause localized melting of the stud projecting portion 22 and recess 12 along their opposed respective contact surfaces, but not excessive heat that will significantly alter material properties of the component substrate 10 or the stud 20 at any significant distance from the contact surface. Accordingly, localized heating is stopped when desired melting of the respective surfaces 22 and 12 is achieved.

After achieving the desired thin weld 40 the now mutually affixed component substrate 10 and repair stud 20 are allowed to cool for subsequent removal from the stud welding apparatus 30. The repair stud 20 and extruded weld material 42 are conformed to the surrounding surface profile, restoring the repaired component 10 to its original condition, shown in FIG. 5. The now repaired component 10 no longer has surface damage, which is replaced by fresh repair stud material 20, having substantially similar material properties to the original substrate material.

Figure 5:
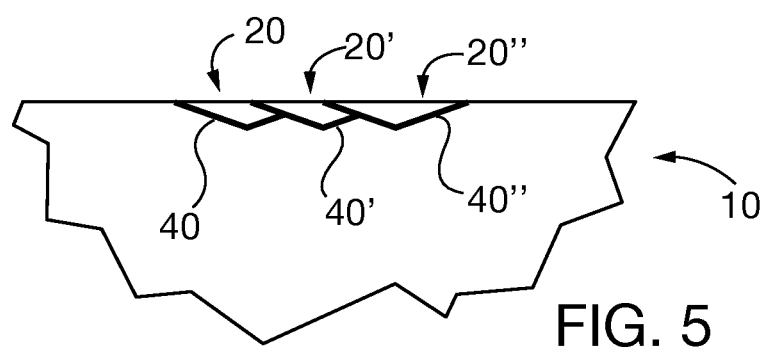
FIG. 5 is a schematic elevational view of a superalloy component repaired in accordance with an embodiment of the present invention.

Specifically, surface hardness and strength properties within the repaired area are substantially similar to those of the original surrounding material. Referring to FIG. 5, a multi-dimensional continuous weld longer than the diameter of the stud 20 may be formed in a superalloy component 10 by sequentially forming and stud welding multiple studs 20, 20', 20", etc., so that adjoining and overlapping welds 40, 40', 40", etc. are formed.

The localized affixation along the weld 40 does not significantly negatively impact structural material properties of the repaired component substrate 10 and the stud 20. Limited post repair heat treatment (if any is required) minimizes—if not totally eliminates—subsequent risk of repaired component strain age cracking. Thus, time and expense of superalloy component fabrication or repair may be undertaken with the repair methods of the present invention, without undue risk of repair failure. In the power generation field, surface cracked turbine blades may be repaired without the need to scrap and replace them with new blades.

In any selected stud welding methods used to perform the repair of the present invention, the overall objective is to achieve localized bonding between the superalloy subcomponents along the weld 40 and ceasing additional heat input, without significantly impacting the superalloy material properties within the generalized substrate of either subcomponent. Unlike known welding techniques that tend to liquefy the respective superalloy substrates (and thus negatively alter material properties making them susceptible to subsequent cracking), stud welding localized and minimal melting with subsequent pressure impacting of the opposed surfaces of the substrate 10 and stud 20 practiced by the present invention avoids gross changes in the superalloy substrates—especially eliminating residual stresses associated with shrinkage typical during weld solidification. In particular, filling an excavation with molten filler metal by gas tungsten arc, gas metal arc, laser or shielded metal arc welding results in shrinkage stresses in the plane of the excavation that are restrained by the walls of the excavation. Such stresses must be sustained by the solidifying metal itself and high residual tensile stresses result in the solidified deposit. Alternately, with stud welding, solidification is largely uniaxial and aligned with the axis of the stud. Axial compressive forces are intentionally exerted during solidification. Residual tensile stresses from solidification are thereby minimized.

When practicing the present invention, superalloy components can be joined or repaired with known proven stud welding equipment. Damaged superalloy component material can be removed and repair studs fabricated by electric discharge machining or other known metal cutting techniques. Known stud welding equipment and techniques may be employed to affix repair studs to their mating substrate recesses. The stud-repaired superalloy component external surface profile can be restored to original profile specifications by grinding or cutting the repair stud and surrounding contact surface to match the repaired component's local profile.

While the geometry of recess 12 and stud mating surface 22 may be similar, a more pointed stud may be considered. This would help ensure that arc initiation and melting starts at the axial center of the assembly and proceeds radially outward to enhance material extrusion 42.

While stud end 22 may be simply shaped, it is also common that it includes an aluminum flux ball or coating to deoxidize weld metal and to stabilize the arc. Inert gas shielding may also be used to prevent reaction with air. Preheating of substrate or stud may also be useful to improve material ductility during welding.

While the structural joining of superalloy components exemplary embodiments herein have been primarily described with reference to superalloy component repair, the same methods may be used to fabricate superalloy structures by joining subcomponents. For example, a projection on one superalloy subcomponent may be affixed to a recess on another superalloy subcomponent.

Although various embodiments, which incorporate the teachings of the present invention, have been shown and described in detail herein, those skilled in the art can readily devise many other varied embodiments that still incorporate these teachings.

What is claimed is:
1. A joined superalloy component comprising:
  a superalloy substrate defining a recess having a recess profile;
  a mating superalloy stud having a stud projection captured within the substrate recess, with a projection profile conforming with the entire substrate recess profile along a contact surface; and
  the substrate and stud affixed to each other along the entire contact surface by a process of stud welding by:
    inserting the stud and substrate in a stud welding apparatus;
    orienting the stud projection and substrate recess in an opposed spaced relationship with a gap there between;
    passing current between the stud projection and recess and forming an arc there between with the stud welding apparatus;
    melting the opposed stud projection and substrate recess opposed surfaces; and
    pressing the melted stud projection and substrate recess opposed surfaces into contact with each other along the entire contact surface, thereby forming a weld there between and extruding excess weld outside of the recess.

2. The component of claim 1, wherein the substrate and stud are constructed of a same material with substantially similar mechanical structural properties, and the stud welding does not substantially change said structural properties.

3. The component of claim 1, wherein the substrate is selected from the group consisting of turbine blades and turbine vanes.

4. The component of claim 1, further comprising post-weld shaping the stud to leave substrate recess filled with a portion of welded stud end and restoring the component dimensional surface contour.

5. The component of claim 1, the superalloy substrate and stud comprising more than six percent aggregate aluminum or titanium content.

6. A method for joining superalloy structures, comprising:
   forming a recess in a superalloy component substrate having a recess profile defined by the remaining substrate;
   forming a mating superalloy stud having a stud projection, with a projection profile conforming to the entire substrate recess profile along a corresponding contact surface;
   orienting the stud projection and substrate recess in an opposed spaced relationship with a gap there between;
   passing current between the stud projection and recess and forming an arc there between with the stud welding apparatus;
   melting the opposed stud projection and substrate recess opposed surfaces; and
   pressing the melted stud projection and substrate recess opposed surfaces into contact with each other along the entire contact surface, thereby forming a weld there between and extruding excess weld outside of the recess.

7. The method of claim 6, wherein the recess forming step is performed by machining selected from the group consisting of electric discharge machining and mechanical milling, drilling and grinding.

8. The method of claim 6, wherein the substrate and stud are constructed of a same material with substantially similar mechanical structural properties, and the stud welding does not substantially change said structural properties.

9. The method of claim 8, wherein the substrate is selected from the group consisting of turbine blades and turbine vanes.

10. The method of claim 9, further comprising conforming profile of an exterior facing surface of the stud with that of the surrounding substrate.

11. The method of claim 6, further comprising conforming profile of an exterior facing surface of the stud with that of the surrounding substrate.

12. The method of claim 6, the superalloy component substrate and stud comprising more than six percent aggregate aluminum or titanium content.

13. A method for repairing a superalloy component, comprising:
   removing a damaged portion of superalloy component substrate and forming an excavated recess therein having a recess profile defined by the remaining substrate;
   forming a mating superalloy repair stud having a stud projection, with a projection profile conforming to the entire substrate recess profile along a corresponding contact surface;
   orienting the stud projection and substrate recess in an opposed spaced relationship with a gap there between;
   passing current between the stud projection and recess and forming an arc there between with the stud welding apparatus;
   melting the opposed stud projection and substrate recess opposed surfaces; and
   pressing the melted stud projection and substrate recess opposed surfaces into contact with each other along the entire contact surface, thereby forming a weld there between and extruding excess weld outside of the recess.

14. The method of claim 13, wherein the recess forming step is performed by machining selected from the group consisting of electric discharge machining and mechanical milling, drilling and grinding.

15. The method of claim 13, wherein the substrate and repair stud are constructed of a same material with substantially similar mechanical structural properties, and the stud welding does not substantially change said structural properties.

16. The method of claim 15, wherein the repaired component substrate is selected from the group consisting of turbine blades and turbine vanes.

17. The method of claim 16, further comprising conforming profile of an exterior facing surface of the repair stud with that of the surrounding substrate.

18. The method of claim 13, wherein the repaired component substrate is selected from the group consisting of turbine blades and turbine vanes.

19. The method of claim 18, further comprising conforming profile of an exterior facing surface of the repair stud with that of the surrounding substrate.

20. The method of claim 13, the superalloy component substrate and stud comprising more than six percent aggregate aluminum or titanium content.

\* \* \* \* \*